United States Patent
Macias

(10) Patent No.: US 11,910,379 B2
(45) Date of Patent: *Feb. 20, 2024

(54) SYSTEMS AND METHODS FOR REGIONAL ASSIGNMENT OF MULTI-ACCESS EDGE COMPUTING RESOURCES

(71) Applicant: Verizon Patent and Licensing Inc., Basking Ridge, NJ (US)

(72) Inventor: John F. Macias, Antelope, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/822,233

(22) Filed: Aug. 25, 2022

(65) Prior Publication Data

US 2022/0417962 A1 Dec. 29, 2022

Related U.S. Application Data

(63) Continuation of application No. 17/223,516, filed on Apr. 6, 2021, now Pat. No. 11,452,122.

(51) Int. Cl.
| | |
|---|---|
| *H04W 72/1263* | (2023.01) |
| *H04W 76/10* | (2018.01) |
| *H04W 64/00* | (2009.01) |
| *H04W 72/20* | (2023.01) |
| *H04W 72/52* | (2023.01) |
| *H04W 72/50* | (2023.01) |

(52) U.S. Cl.
CPC ....... *H04W 72/1263* (2013.01); *H04W 64/00* (2013.01); *H04W 72/20* (2023.01); *H04W 72/52* (2023.01); *H04W 72/535* (2023.01); *H04W 76/10* (2018.02)

(58) Field of Classification Search
CPC ..... H04W 76/10; H04W 72/12; H04W 72/20; H04W 72/535
See application file for complete search history.

(56) References Cited

U.S. PATENT DOCUMENTS 10,110,495 B1 * 10/2018 Sabella ................... H04W 4/24
2021/0076250 A1 * 3/2021 Wang ................ H04W 28/0221

* cited by examiner

*Primary Examiner* — Sulaiman Nooristany

(57) ABSTRACT

A MEC relocation service automatically directs user equipment (UE) away from a "home" multi-access edge computing (MEC) cluster to a different MEC cluster when the home MEC cluster cannot support service while the UE is outside a regional area. A MEC cluster may receive an application service request for MEC services from a UE device outside a regional service area of the MEC cluster. The MEC cluster may determine if service level requirements for the application service request can be met by the MEC cluster. When the service level requirements cannot be met by the network device, the MEC cluster may submit, to a network device, a query for a different MEC cluster in another regional service area. The MEC cluster may establish a direct connection with the different MEC cluster to transfer customer data for the application service request.

20 Claims, 7 Drawing Sheets

| "Follow Me" MEC Authorization | Admin. Settings |
|---|---|
| Application Service | Joe's Holograph |
| Home MEC Location | Los Angeles, CA |
| Target MEC Location | Chicago, IL |
| Redundancy Permission | Yes/No |
| Redundancy Duration | Time specific/While at new location |
| Cost Level | Threshold |
| ... | ... |

FIG. 6

SYSTEMS AND METHODS FOR REGIONAL ASSIGNMENT OF MULTI-ACCESS EDGE COMPUTING RESOURCES

BACKGROUND

This application is a continuation of U.S. patent application Ser. No. 17/223,516, filed on Apr. 6, 2021, and titled "Systems and Methods for Regional Assignment of Multi-Access Edge Computing Resources," the contents of which are incorporated herein by reference.

BACKGROUND

Multi-access Edge Computing (MEC) is being developed in which some network capabilities previously implemented in a core network or cloud network (e.g., computation, storage, transport, etc.) are situated at the network edge to provide benefits such as improved latency and reduced traffic over the core network. Applications may be configured with a subscription to MEC services to provide an optimal user experience for the end user. Application developers/providers may select service levels for their applications that use MEC services, defining parameters such as a minimum latency requirement and a minimum number of service instances for their application.

BRIEF DESCRIPTION OF THE DRAWINGS

FIG. 6 is a diagram illustrating information that may be solicited by a MEC transfer authorization request, according to an implementation described herein.

DETAILED DESCRIPTION OF THE PREFERRED EMBODIMENTS

Figure 1:
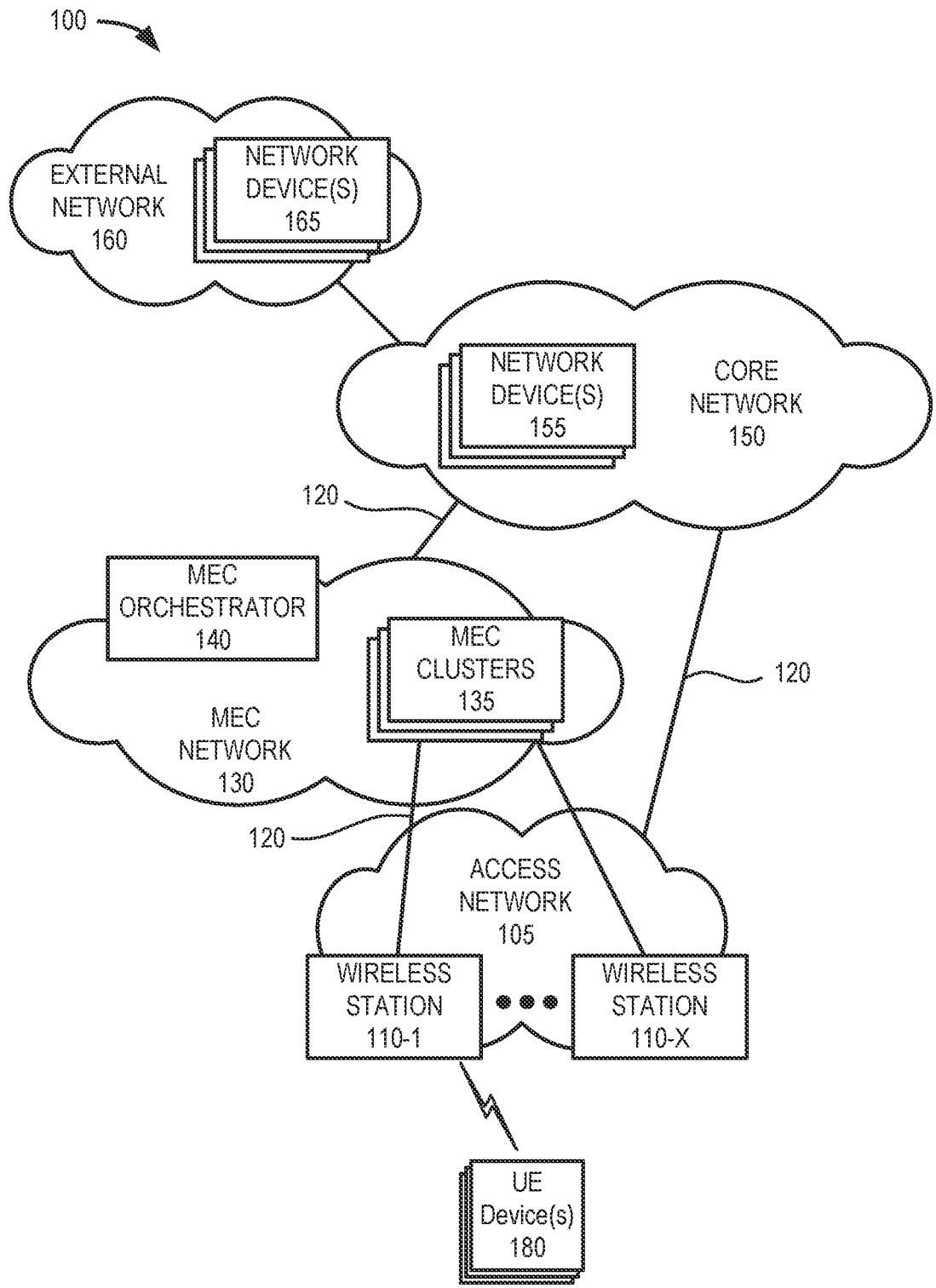
FIG. 1 illustrates an exemplary environment in which systems and methods described herein may be implemented.

The following detailed description refers to the accompanying drawings. The same reference numbers in different drawings may identify the same or similar elements. Also, the following detailed description does not limit the invention.

Multi-access Edge Computing (MEC) servers allow high network computing loads to be transferred onto a network edge. Depending on the location of the edge servers relative to the point of attachment (e.g., a wireless station for user equipment (UE) devices), MEC servers may provide various services and applications to UE devices with minimal latency. MEC servers can provide applications (e.g., applications being executed on mobile devices) with compute, storage, and transport resources near a network edge to UE devices and are particularly well-suited for applications with low-latency, localized compute, and localized storage requirements. Generally, lower latencies are achieved when MEC resources are positioned within shorter physical distances to the network edge than existing cloud servers. Thus, service providers are establishing MEC resources in multiple geographic regions to minimize latency for services to mobile devices and guarantee certain quality-of-service (QoS) levels.

A customer may register with a service provider to make an application or service available for MEC services. For each application, the customer may select an application policy that defines service parameters, such as achieving certain key performance indicators (KPIs) and/or service level agreements (SLAs) for MEC services. For example, a customer may set an application policy that requires a minimum round-trip delay time (RTT) (e.g., less than 30 milliseconds) and a guaranteed minimum throughput (e.g., 50 megabits-per-second (Mbps)), among other parameters. To ensure that the application or service achieves the required SLA for users, application services (e.g., computation, storage, transport, etc., for the particular application) may be deployed in one or more MEC locations.

For reasons related to security, control, cost, etc., a service provider or a customer may prefer to minimize the number/amount of MEC locations (also referred to herein as "MEC clusters") servicing an application. For example, an application servicing a small business may be relevant for a few employees serviced by a single MEC location. The application may require at the MEC location an instance of a virtual machine (VM), a containerized application, and/or content. Particularly, a user device may be associated with a "home" MEC location with deployments to provide the required level of service.

In some network configurations, when user equipment (UE, also referred to as a "UE device") registers with a network, the UE device may be assigned to the corresponding "home" MEC location. For example, when a customer's MEC resources are stored at a single MEC cluster, the network may default to the home MEC cluster. However, if a user moves to a different region (e.g., travels across multiple states or time zones, for example) and the UE device then attempts to access MEC services for the application, the home MEC cluster may not be able to meet required service parameters. Using current network practices, a customer may manually provide configuration settings to deploy services at a different local MEC cluster that can achieve required service parameters. However, there remains a need for a system to dynamically detect home MEC service deficiencies and provide alternative MEC services for customers with home MEC configurations.

According to systems and methods described herein, a MEC relocation service is provided. A MEC cluster may receive, from the UE device, an application service request for MEC services. The application service request may be directed to the MEC cluster from the device that is outside a regional service area of the MEC cluster. The MEC cluster may determine if service level requirements for the application service request can be met by the MEC cluster. When the service level requirements for the application service request cannot be met by the network, the MEC cluster may submit, to a core network device, a query for a different MEC cluster in another regional service area. The MEC cluster may receive, from the core network device, transfer instructions to direct the application service request to the different MEC cluster. After user authorization to transfer resources is received, the MEC cluster may establish a direct temporary connection with the different MEC cluster and transfer, to the different MEC cluster using the temporary connection, customer data to support the application service request based on the transfer instructions.

FIG. 1 illustrates an exemplary environment 100 in which the MEC relocation service described herein may be implemented. As illustrated, environment 100 includes an access network 105, a MEC network 130, a core network 150, and an external network 160. Access network 105 may include wireless stations 110-1 through 110-X (referred to collectively as wireless stations 110 and generally as wireless station 110). MEC network 130 may include MEC clusters 135 and a MEC orchestrator 140. Core network 150 may include network devices 155, and external network 160 may include network devices 165. Environment 100 further includes one or more UE devices 180. Access network 105, MEC network 130, and core network 150 may be collectively referred to herein as a transport network.

The number, the type, and the arrangement of network devices and the number of UE devices 180 in environment 100 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links between the networks, between the network devices, and between UE devices 180 and the network devices. Environment 100 may be implemented to include wired, optical, and/or wireless communication links among the network devices and the networks illustrated. A connection via a communication link may be direct or indirect. For example, an indirect connection may involve an intermediary device and/or an intermediary network not illustrated in FIG. 1. A direct connection may not involve an intermediary device and/or an intermediary network. The number and the arrangement of communication links illustrated in environment 100 are exemplary.

Access network 105 may include one or multiple networks of one or multiple types and technologies. For example, access network 105 may include a Fifth Generation (5G) Radio Access Network (RAN), a Fourth Generation (4G) RAN, a 4.5G RAN, and/or another type of future generation RAN. By way of further example, access network 105 may be implemented to include a Next Generation (NG) RAN, an Evolved UMTS Terrestrial Radio Access Network (E-UTRAN) of a Long Term Evolution (LTE) network, an LTE-Advanced (LTE-A) network, and/or an LTE-A Pro network, and/or another type of RAN (e.g., a legacy RAN). Access network 105 may further include other types of wireless networks, such as a WiFi network, a Worldwide Interoperability for Microwave Access (WiMAX) network, a local area network (LAN), or another type of network that may provide an on-ramp to wireless stations 110 and/or core network 150.

Depending on the implementation, access network 105 may include one or multiple types of wireless stations 110. For example, wireless station 110 may include a next generation Node B (gNB), an evolved Node B (eNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node. According to an implementation, wireless stations 110 may include a gNB with multiple distributed components, such as a central unit (CU), a distributed unit (DU), a remote unit (RU or a remote radio unit (RRU)), or another type of distributed arrangement. Wireless stations 110 may connect to core network 150 and/or MEC network 130 via backhaul links 120, such as wired or optical links. According to various embodiments, access network 105 may be implemented according to various architectures of wireless service, such as, for example, macrocell, microcell, femtocell, or other configuration. Additionally, according to various exemplary embodiments, access network 105 may be implemented according to various wireless technologies (e.g., radio access technology (RAT), etc.), wireless standards, wireless frequencies/bands, and so forth.

MEC network 130 includes a platform that provides services at the edge of a network, such as access network 105. MEC network 130 may be implemented using one or multiple technologies including, for example, network function virtualization (NFV), SDN, cloud computing, or another type of network technology. Depending on the implementation, MEC network 130 may include, for example, virtualized network functions (VNFs), multi-access (MA) applications/services, and/or servers. MEC network 130 may also include other network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices and/or network resources (e.g., storage devices, communication links, etc.). Devices in MEC network 130 may communicate with core network 150 via backhaul links 120, such as wired or optical links MEC clusters 135 include the various types of network devices that may be deployed in different areas/regions of MEC network 130. Each MEC cluster 135 includes a platform that provides an application service. MEC clusters 135 may include virtual network devices (e.g., VNFs, servers, hosts, containers, hypervisors, virtual machines, network function virtualization infrastructure (NFVI), and/or other types of virtualization elements, layers, hardware resources, operating systems, engines, etc.) and associated application services for use by UE devices 180. MEC clusters 135 may be located to provide geographic proximity to various groups of wireless stations 110, the combined cells of which may be considered a regional service area. In some instances, MEC clusters 135 may be co-located with wireless stations 110 or network devices 155. Alternatively, MEC cluster 135 may not be co-located.

MEC orchestrator 140 may include logic that provides MEC selection and orchestration among MEC clusters 135. According to an implementation, MEC orchestrator 140 may be a centralized component for MEC network 130. For example, MEC orchestrator 140 may be co-located with one or more network devices 155 of core network 150. MEC orchestrator 140 may maintain an overlay grid over an entire geographic coverage area. The grid may divide the geographic coverage area into uniquely identifiable regions. According to an implementation, MEC orchestrator 140 may track the KPIs/parameters that are used to define a customer's MEC application policy for each region. The MEC application policy may be provided, for example, as a configuration file and may define the parameters to select a home MEC cluster 135 or set of MEC clusters 135 for an application. MEC orchestrator 140 may assess capabilities of the serving MEC cluster and other MEC clusters to meet policy requirements for a MEC application. MEC orchestrator 140 is described further below in connection with, for example, FIG. 2.

Core network 150 may include one or multiple networks of one or multiple network types and technologies to support access network 105. For example, core network 150 may be implemented to include a next generation core (NGC) network for a 5G network, an Evolved Packet Core (EPC) of an LTE network, an LTE-A network, an LTE-A Pro network, another type of 4G core network, and/or a legacy core network. According to one implementation, core network 150 may include a non-standalone (NSA) core network to support dual coverage using 4G and 5G networks. In another implementation, core network 150 may include a 5G standalone (SA) architecture.

Core network 150 may include various network devices 155. Depending on the implementation, network devices 155 may include 5G core network components (e.g., a User Plane Function (UPF), an Application Function (AF), an Access and Mobility Management Function (AMF), a Session Management Function (SMF), a Unified Data Management (UDM) function, a Network Slice Selection Function (NSSF), a Policy Control Function (PCF), a Unified Data Repository (UDR) etc.), 4G core network components (e.g., a Serving Gateway (SGW), a Packet data network Gateway (PGW), a Mobility Management Entity (MME), a Home Subscriber Server (HSS) etc.), or another type of core network components (e.g., future 6G network components). In other implementation, network devices 155 may include combined 4G and 5G functionalities.

External network 160 may include one or multiple networks. For example, external network 160 may be implemented to include a service or an application-layer network, the Internet, an Internet Protocol Multimedia Subsystem (IMS) network, a Rich Communication Service (RCS) network, a cloud network, a packet-switched network, or other type of network that hosts an end device application or service. For example, the end device application/service network may provide various applications or services pertaining to broadband access in dense areas (e.g., pervasive video, smart office, operator cloud services, video/photo sharing, etc.), broadband access everywhere (e.g., 50/100 Mbps, ultralow-cost network, etc.), higher user mobility (e.g., high speed train, remote computing, moving hot spots, etc.), Internet of Things (IoT) (e.g., smart wearables, sensors, mobile video surveillance, etc.), extreme real-time communications (e.g., tactile Internet, etc.), lifeline communications (e.g., natural disaster, etc.), ultra-reliable communications (e.g., automated traffic control and driving, collaborative robots, health-related services (e.g., monitoring, remote surgery, etc.), drone delivery, public safety, etc.), and/or broadcast-like services.

Depending on the implementation, external network 160 may include various network devices 165. For example, external devices 165 may provide various applications, services, or other type of UE device assets, such as servers (e.g., web, application, cloud, etc.), mass storage devices, data center devices, and/or other types of network devices pertaining to various network-related functions.

UE device 180 includes a device that has computational and wireless communication capabilities. UE device 180 may be implemented as a mobile device, a portable device, a stationary device, a device operated by a user, or a device not operated by a user. For example, UE device 180 may be implemented as a Mobile Broadband device, a smartphone, a computer, a tablet, a netbook, a wearable device, a vehicle support system, a game system, a drone, a machine-type communication (MTC) device, an Internet-of-Things (IoT) device, or some other type of wireless device. According to various exemplary embodiments, UE device 180 may be configured to execute various types of software (e.g., applications, programs, etc.), such as an application client for an application that receives service from MEC network 130 and/or external network 160. UE device 180 may support one or multiple radio access technologies (RATs, e.g., 4G, 5G, etc.), one or multiple frequency bands, network slicing, dual-connectivity, and so forth. Additionally, UE device 180 may include one or multiple communication interfaces that provide one or multiple (e.g., simultaneous or non-simultaneous) connections via the same or different RATs, frequency bands, etc. According to some implementations, UE device 180 may include a client application. As described further herein, the client application may be executed on end device 180 to selectively use MEC compute resources, such a MEC compute resources deployed in a "home" MEC cluster 135.

According to implementations described herein, MEC network 130 may move an instance of a VM, a containerized application, or content from one MEC cluster 135 to another MEC cluster 135 based upon the user's location. A current administrator's location of UE device 180 may be determined when UE device 180 registers with core network 150. The administrator would be allowed to move their MEC "presence" to the current local serving MEC cluster 135. As described further herein, this move could be a temporary or permanent move, and limits to duration, functionality, and permissions may be part of the "presence" relocation.

As used herein, the terms "user," "administrator," and/or "customer" may be used interchangeably. Also, the terms "user," "administrator" and/or "customer" are intended to be broadly interpreted to include a user device (UE device 180) or a user of a user device.

Figure 2:
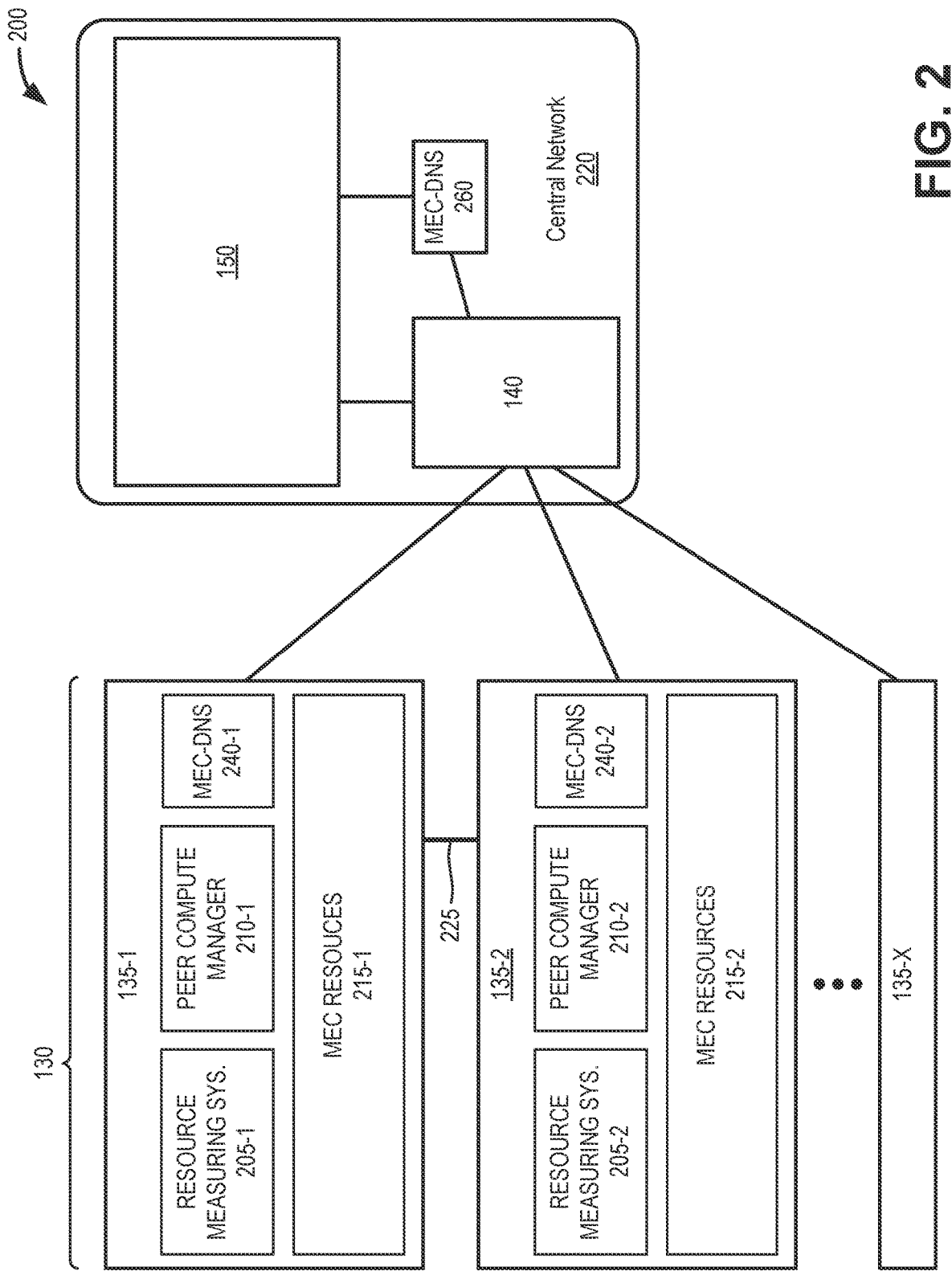
FIG. 2 is a diagram of exemplary network connections in a portion of a transport network.

FIG. 2 is a diagram of exemplary network connections in a network portion 200 of environment 100. As shown in FIG. 2, network portion 200 may include MEC network 130 with multiple MEC clusters 135-1 through 135-X (referred to collectively as MEC clusters 135 and generally as MEC cluster 135) and a central network 220.

Each MEC cluster 135 may service requests from UE devices 180 connected via wireless stations 110 (not shown in FIG. 2). Each MEC cluster 135 may include a resource measuring system 205, a peer compute manager 210, MEC resources 215, and MEC domain name system (DNS) 240. Each MEC cluster 135 may be connected within MEC network 130 by transport links 225. Each MEC cluster 135 may be communicatively coupled to one or more wireless station 110 (e.g., via wired or optical links 120) and communicatively coupled to core network 150 via wired or optical links. In some instances, MEC clusters 135 may be located in different geographic regions.

MEC cluster 135 may include a combination of hardware and software to provide application services. MEC cluster 135 may include, for example, devices that support the virtualization of central processing unit (CPU) and/or graphics processing unit (GPU) services. MEC cluster 135 may include various physical resources (e.g., processors, memory, storage, communication interface, etc.), software resources (e.g., operating system, etc.) and other virtualization elements (e.g., hypervisor, container engine, etc.). In the arrangement of network portion 200, the transport link 225 between any two MEC clusters 135 is optimized and the latency between any two MEC clusters may be minimized.

According to an implementation, the MEC clusters 135 may subscribe with each other and MEC orchestrator 140 to share information of local resource usages, forecasts, and availabilities.

Resource measuring system 205 may monitor a UE device 180's application for compute resources on the accessed MEC 135 (e.g., a home MEC) and determine the need to replicate a container/data on a best serving MEC cluster 135. For example, resource measuring system 205 may determine if application requirements can be satisfied by the current MEC cluster 135 based upon, for example, location from an internet protocol (IP) address (of wireless station 110), a latency budget, a data volume, and traffic type (e.g., QoS Class Indicator (QCI)). Latency budget, a data volume, and traffic type may be determined for example, from a MEC application policy. In response to a query (e.g., from MEC orchestrator 140), resource measuring system 205 may determine that a current local MEC cluster 135 would be more appropriate to support present requirements for UE device 180 than a current "home" MEC cluster 135.

According to an implementation, resource measuring system 205 may perform dynamic resource updates to identify available resources and capabilities of MEC cluster 135. In some implementations, resource measuring system 205 may utilize cellular network intelligence parameters. The dynamic resource updates may monitor, for example, a. minimum/maximum round trip time (RTT) over the air from a wireless station 110 in a regional service area to a cell boundary;
b. minimum/maximum/average RTT from a wireless station 110 in the regional service area to a MEC cluster 135;
c. resource availability on the MEC cluster 135;
d. backhaul availability on the MEC cluster 135; and
e. details of application instances running on MEC cluster 135.

Resource measuring system 205 may combine one or more of the dynamic resource parameters to evaluate against a MEC application policy and determine if service level requirements for an application service request can be met by MEC cluster 135.

Peer compute manager 210 may establish direct temporary connections with other MEC clusters (e.g., via transport link 225) to support transfers of MEC resources. For example, peer compute manager 210-1 from a "home" MEC cluster 135-1 may establish a direct temporary connection with another peer compute manager 210-2 from a local MEC cluster 135-2 in support of specific transactions to reduce the overall costs and complexity of creating a new container instance on the local MEC cluster 135. According to one implementation, the direct temporary connection can be established via port forwarding to permit file transfers from home MEC cluster 135-1 to local MEC cluster 135-2. According to another implementation, the direct temporary connection may be established via bridging, a peer-to-peer server configuration, or another standard IP networking method.

Peer compute manager 210 may maintain redundancy between a "home" MEC cluster and a different MEC cluster for a defined period, indefinitely, or based on MEC usage patterns of the UE device. For example, a user/administrator may indicate a particular duration that MEC resources to support the application service may be maintained at a remote MEC cluster 135. Alternatively, data from resource measuring system 205 may be used to support a usage-based determination for tearing down redundant resources at an unused MEC cluster 135.

MEC resources 215 may include variable compute configurations, including, without limitation, a central processing unit (CPU), a graphical processing unit (GPU), a field programmable gate array (FPGA), etc. Additionally, or alternatively, MEC resources 215 may also include memory to store customer data and/or other information to support an application service. MEC resources 215 may also include devices to perform orchestration and containerization functions.

MEC domain name system (DNS) 240 may provide local DNS services for MEC cluster 135. MEC DNS 240 may include logic that provides DNS resolution services for application services and/or microservices provided by MEC network 130. MEC-DNS 240 may serve, for example, a particular region to update fully qualified domain names (FQDNs) for particular services instantiated at a MEC cluster 135. MEC DNS 240 may receive updates from, or provide updates to, an authoritative MEC DNS 260 in a central part of MEC network 130 (e.g., central network 220).

Central network 220 may include a provider network that includes or is in communication with core network 150. Central network 220 may include devices of MEC network 130, such as MEC orchestrator 140 and authoritative MEC-DNS 260.

MEC orchestrator 140 may track KPIs and parameters that are used in each customer's MEC application policy. MEC orchestrator 140 may maintain an updated list of wireless stations 110 (or cell sites) in closest proximity to a regional MEC cluster 135 and an updated list of MEC clusters 135 connected to the core infrastructure. MEC orchestrator 140 may use network data to identify a MEC cluster 135 that can support a customer's application policy. Some examples of KPIs/parameters tracked by MEC orchestrator 140 include: (a) min/max/average round trip time from cell-site to MEC cluster, (b) resource availability of the MEC cluster, (c) backhaul availability on the MEC network, and (d) details of application instances running on the MEC clusters. After MEC orchestrator 140 assigns a MEC cluster 135 for an application (e.g., a "home" MEC), MEC orchestrator 140 may receive dynamic resource updates from resource measuring system 205 in MEC cluster 135 to dynamically manage application compute requests for UE devices 180. In relation to MEC selection and orchestration processes described herein, core network 150 may include, among other network functions, a PCF, a NEF, and a core UPF implemented in network devices 155.

Authoritative MEC-DNS 260 may provide centralized DNS services for MEC network 130. Authoritative MEC-DNS 260 may include logic that provides DNS resolution services for application services and/or micro-services provided by MEC network 130. In some implementations, authoritative MEC-DNS 260 and MEC orchestrator 140 may be combined in a single device or group of devices.

Figure 3:
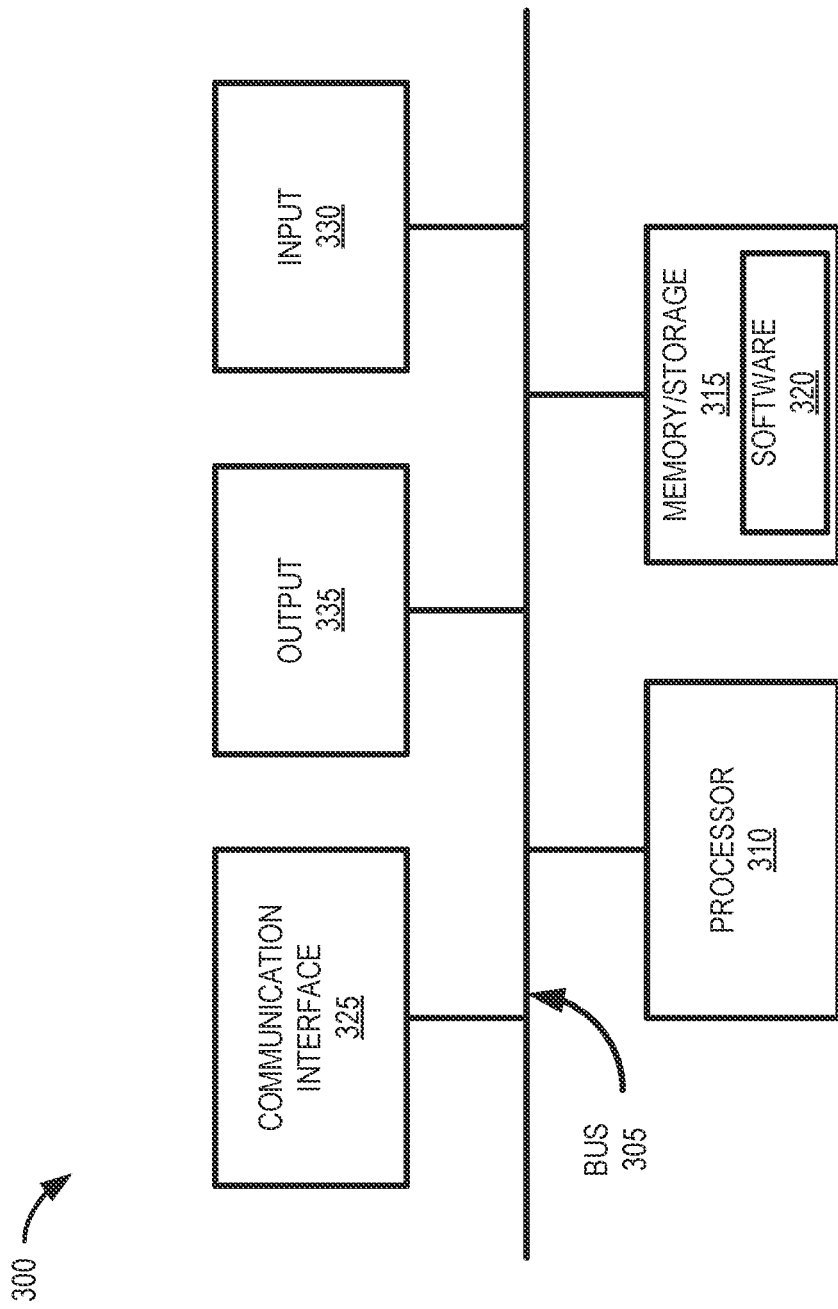
FIG. 3 illustrates exemplary components of a device that may correspond to one or more of the devices illustrated and described herein.

FIG. 3 is a diagram illustrating example components of a device 300 according to an implementation described herein. Wireless station 110, MEC clusters 135, MEC orchestrator 140, network device 155, network device 165, UE device 180, resource measuring system 205, peer compute manager 210, and MEC DNS 240/260 may each include one or more devices 300. In another implementation, a device 300 may include multiple network functions. As illustrated in FIG. 3, according to an exemplary embodiment, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc. Processor 310 may be a dedicated component or a non-dedicated component (e.g., a shared resource).

Processor 310 may control the overall operation, or a portion of operation(s), performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include a drive for reading from and writing to the storage medium.

Memory/storage 315 may be external to and/or removable from device 300, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. Software 320 may include an operating system. Software 320 is also intended to include firmware, middleware, microcode, hardware description language (HDL), and/or other forms of instruction. Additionally, for example, MEC cluster 135 and/or MEC orchestrator 140 may include logic to perform tasks, as described herein, based on software 320. Furthermore, UE devices 180 may store applications that require services/resources from MEC clusters 135.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include one or more antennas. For example, communication interface 325 may include an array of antennas. Communication interface 325 may operate according to a communication standard and/or protocols. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4:
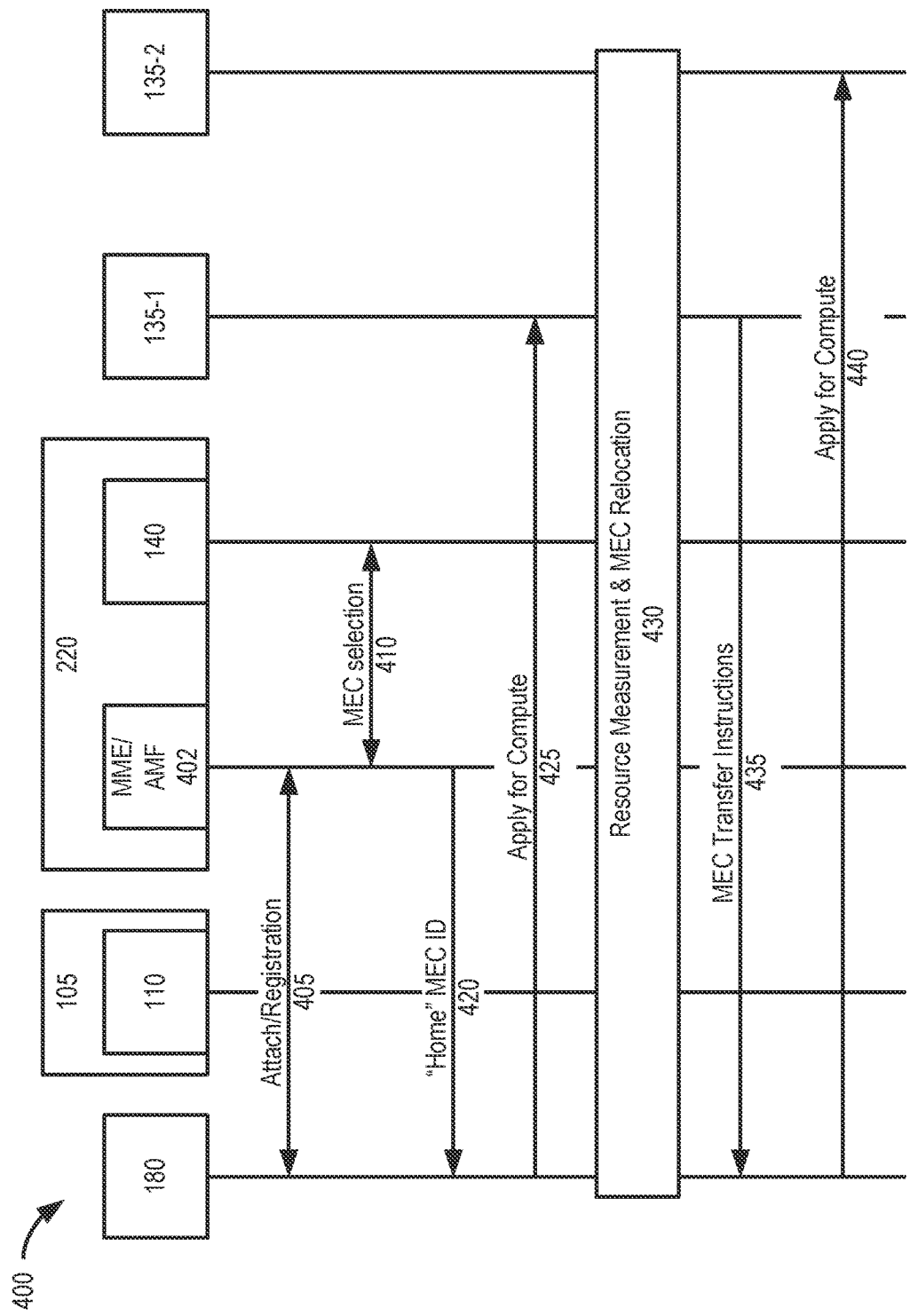
FIGS. 4 and 5 are signal flow diagrams of exemplary communications for configuring MEC resources to direct a client to an optimal MEC cluster in a portion of a transport network.
Figure 5:
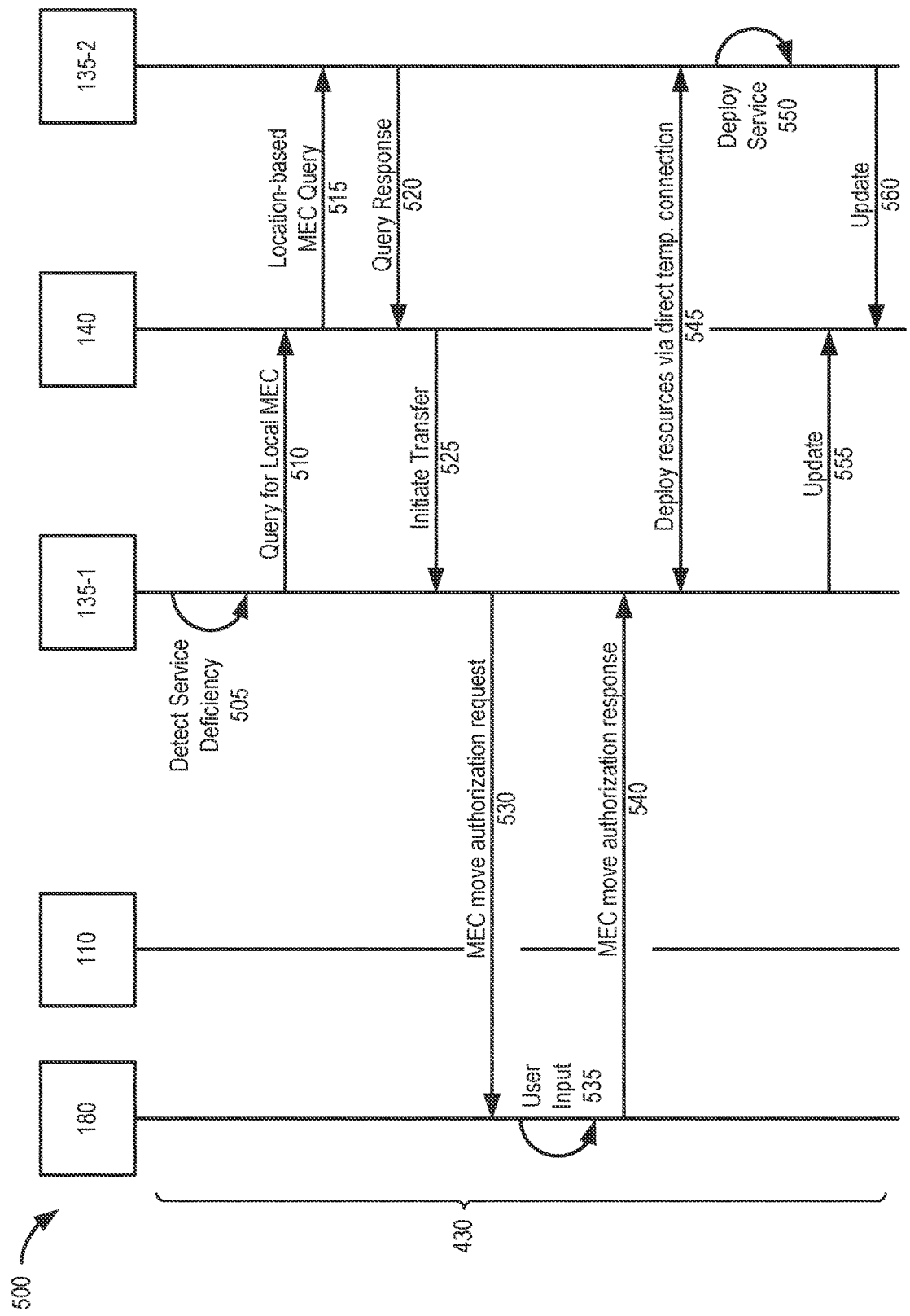

FIGS. 4 and 5 are signal flow diagrams of exemplary communications for the MEC relocation service. More particularly, FIGS. 4 and 5 include communications for configuring MEC resources to direct a device client to the optimal MEC service instance in a portion 400 of network environment 100. Network portion 400 may include access network 105 (with wireless station 110), central network 220, UE device 180, and MEC clusters 135-1 and 135-2. Central network 220 may include MEC orchestrator 140 and an MME/AMF 402.

MME/AMF 402 may correspond to one or more of network devices 155 for alternately servicing a 4G or 5G network. For 4G communications, MME/AMF 402 may function as an MME to implement control plane processing for core network 150. For example, MME/AMF 402 may implement tracking and paging procedures for UE device 180, may activate and deactivate bearers for UE device 180, may authenticate a user of UE device 180, and may interface to other radio access networks. For 5G communications, MME/AMF 402 may function as an AMF to perform registration management, connection management, reachability management, mobility management, and/or other types of management processes.

Communications shown in FIG. 4 provide simplified illustrations of communications in network portion 400 and are not intended to reflect every signal or communication exchanged between devices/functions. For FIG. 4, it is assumed that MEC clusters 135-1 and 135-2 are located in different geographic regions.

In a 4G or 5G NSA networks, the MEC relocation service may utilize a 4G LTE attach procedure (e.g., via access network 105). Thus, as shown in FIG. 4, UE device 180 may initiate an attach procedure 405 which may indicate a wireless station 110 servicing UE device 180. At the end of the attach procedure, UE device 180 may send an "attach complete" message to MME/AMF 402.

In a 5G SA network, the MEC relocation service may utilize a 5G registration procedure (e.g., via access network 105). Thus, as shown in FIG. 4, UE device 180 may initiate an registration procedure 405 which may indicate a wireless station 110 servicing UE device 180. At the end of the registration procedure, UE device 180 may send a "registration complete" message to MME/AMF 402.

After attach/registration procedure 405, MME/AMF 402 may initiate a MEC selection process 410 to determine the appropriate MEC cluster 135 to use for further transactions. For example, MME/AMF 402 may query MEC orchestrator 140 and/or other core network components (e.g., a HSS, a UDM, etc.) to identify a MEC cluster 135-1 for servicing an application on UE device 180. Initially, the user's "home" MEC cluster may be accessed. Particularly, for certain types of MEC services, the "home" MEC cluster may be the only MEC location with customer data. As a result of the MEC selection process 410, MME/AMF 402 may provide the "home" MEC identifier (e.g., an IP address or other network address) to UE device 180 (signal 420).

Using the "home" MEC ID, UE device 180 may establish a data session for the application with "home" MEC cluster 135-1 and provide an application for compute message 425. The application for compute message 425 may indicate, for example, a latency budget, data volume, and/or traffic type (e.g., QCI type). As indicated at reference 430, MEC cluster 135-1 (e.g., resource measuring system 205) may receive then apply for compute message 425 and initiate a resource measurement and MEC relocation process 430. Process 430 may monitor the application for compute 425 and determine if there is a need to move the container with resources for servicing UE device 180 to a better serving MEC cluster (e.g., cluster 135-2). Details of reference 430 are provided in FIG. 5.

Referring to FIG. 5, based on apply for compute message 425, MEC cluster 135-1 (e.g., resource measuring system 205) may detect 505 a service deficiency. For example, MEC cluster 135-1 may determine that it cannot support latency requirements for the application client requesting services on UE device 180. As indicated by query 510, MEC cluster 135-1 may query MEC orchestrator 140 to determine if another MEC cluster is available to provide service for UE device 180 according to the application service requirements (e.g., latency budget, data volume, traffic type, etc.). According to an implementation, query 510 may include a current area indicator for UE device 180 (e.g., an access point ID or wireless station ID for the wireless station 110 servicing UE 180).

In response to query 510, MEC orchestrator 140 may select a local MEC cluster (e.g., MEC cluster 135-2) for UE device 180 and provide a location-based MEC query 515 to MEC cluster 135-2 to confirm that MEC cluster 135-2 can support the application service requirements for UE device 180. MEC cluster 135-2 may provide query response 520 to MEC orchestrator 140 to confirm (or reject) availability. Assuming query response 520 indicates that MEC cluster 135-2 can support the application service requirements for UE device 180, MEC orchestrator 140 may send a message 525 to initiate a MEC transfer.

The "home" MEC cluster (e.g., MEC cluster 135-1) may receive the initiate transfer message 525 and, in response, MEC cluster 135-1 may use the current data session with UE device 180 to send a MEC move authorization request 530 to an administrator using UE device 180. MEC move authorization request 530 may cause UE device 180 (e.g., via the client application) to request user input 535 to confirm that a MEC change is authorized. For example, MEC move authorization request 530 may solicit an administrator to authorize that MEC resources be moved and/or copied to the current local MEC cluster (e.g., MEC cluster 135-2). While FIG. 5 shows that MEC move authorization request 530 is directed to UE device 180, in some instances MEC move authorization request 530 may be directed to a different UE device 180 than the UE device 180 that initiated attach procedure 405. That is, if a user without MEC administrator privileges initiates attach procedure 405, MEC move authorization request 530 may be directed to a different UE device 180 of a user with MEC administrator privileges. Alternatively, in some implementations, the move to a different MEC cluster may be performed automatically without user input.

FIG. 6 provides an example of information that may be solicited by MEC move authorization request 530 and updated by user input 535. As shown in FIG. 6, MEC move authorization request 530 may include one or more sets of MEC administrator settings 605, an application service field 610, a home MEC location field 615, a target MEC location field 620, a redundancy permission field 625, a redundancy duration field 630, and a cost level field 635.

Application service field 610 may identify an application for which MEC services are requested. Entries in application service field 610 may correspond, for example, to services identified in attach procedure 405 (e.g. "Joe's Holograph"). Home MEC location field 615 may identify the location of a current home MEC cluster for the requested application services (e.g., "Los Angeles, CA"). Target MEC location field 620 may identify the location of a target location of a MEC cluster for the requested application services (e.g., "Chicago, IL"), which may be based on the current location of UE device 180. According to an implementation, entries for fields 610-620 may be pre-populated by the home MEC cluster 135-1 (e.g., resource measuring system 205).

Redundancy permission field 625 may include a toggle selection for the user/administrator to allow or deny temporary redundancy of MEC resources at the target MEC cluster. Redundancy duration field 630 may include an entry for a particular duration that MEC resources to support the application service may be maintained at the target MEC cluster. According to one implementation, redundancy duration field 630 may include a time period (e.g., number of hours), a cutoff (e.g., a date/time), or a location-based determination (e.g., maintain redundant deployment while UE device 180 remains in the target MEC region). According to an implementation, entries for fields 625 and 630 may be supplied or amended by the user/administrator.

Cost level field 635 may include a cost associated with a service. For example, based on selections by an administrator may cost level field may indicate an estimated service fee or service level to accommodate the requested MEC cluster redundancy. Thus, in some implementations, communications 530-540 may be an iterative process. According to other implementations, MEC move authorization request 530 may solicit different or additional information than illustrated in FIG. 6. For example, MEC move authorization request 530 may also include fields to indicate a limited transfer (e.g., data only, compute resources only, etc.) and/or options for permanent transfers with eventual deletion of resources from the previous home MEC cluster. In still another implementation, MEC move authorization request 530 may be incorporated into a MEC application policy such that transfer authorization would be pre-authorized and not required as part of MEC relocation process 430.

Returning to FIG. 5, the substance of user input 535 may be provided by UE device 180 to MEC cluster 135-1 via MEC move authorization response 540. MEC cluster 135-1 may receive MEC move authorization response 540. Assuming MEC move authorization response 540 authorizes that MEC resources can be deployed at MEC cluster 135-2, MEC cluster 135-1 may establish a temporary direct connection 545 with MEC cluster 135-2 to provide customer data and deploy resources on MEC cluster 135-2. Temporary direct connection 545 may support specific transactions to reduce the overall costs and complexity of creating a new container/VM instance on the local MEC cluster 135-2. Temporary direct connection 545 can be established via IP networking methods, such as port forwarding, bridging, or a peer to peer server configuration.

As a result of data transferred via temporary direct connection 545, MEC cluster 135-2 may quickly instantiate and deploy 550 the MEC service for UE device 180. MEC cluster 135-1 may provide an update 555 to MEC orchestrator 140 to update service loads. Similarly, MEC cluster 135-2 may provide an update 560 to MEC orchestrator 140 to update the newly deployed service capability and service loads.

Referring again to FIG. 4, as shown at reference 435, MEC cluster 135-1 may direct UE device 180 to transfer service from MEC cluster 135-1 to MEC cluster 135-2. For example, MEC cluster 135-1 may provide a new IP address (corresponding to MEC cluster 135-2) for MEC services for use by the application client of UE device 180. In response to transfer instructions 435, UE device 180 may establish a data session for the application with the local MEC cluster 135-2 and provide an application for compute message 440 to initiate services with MEC cluster 135-2. MEC cluster 135-2 may perform required services for UE device 180, synchronizing data with MEC cluster 135-1 at periodic intervals and/or upon termination of the redundancy period defined in user input 535.

Figure 7:
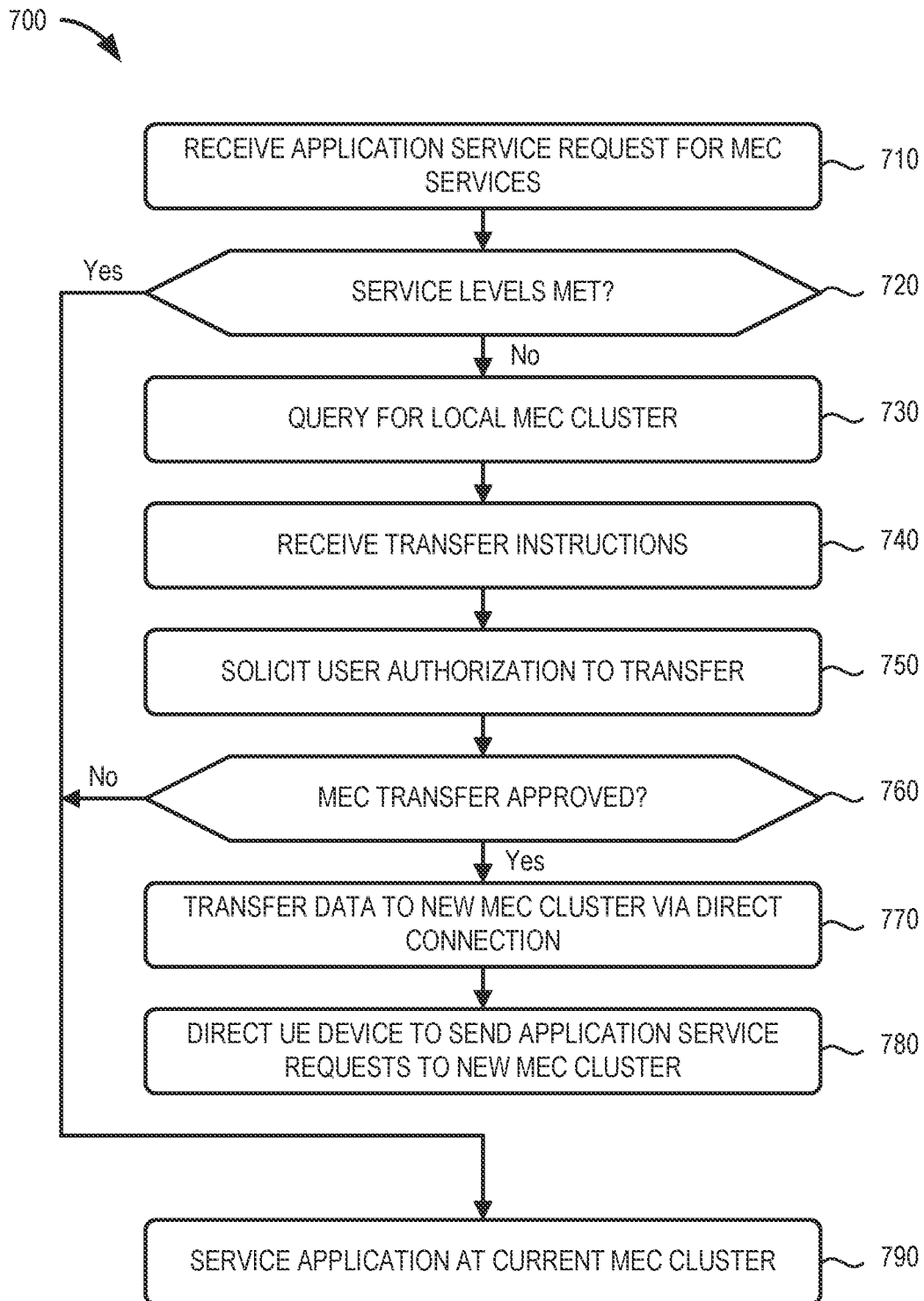
FIG. 7 is a flow diagram illustrating an exemplary process for selecting and managing resources in MEC network, according to implementations described herein.

FIG. 7 is a flow diagram illustrating an exemplary process 700 for managing and selecting resources in MEC network 130. In one implementation, process 700 may be implemented by a MEC cluster 135. In another implementation, process 700 may be implemented by MEC cluster 135 in conjunction with MEC orchestrator 140 and one or more other devices in network environment 100.

As shown in FIG. 7, process 700 may include receiving an application service request (block 710) and determining if required service levels are met (block 720). For example, MEC cluster 135 may receive an application for compute message and determine if MEC cluster 135 can support required latency and other service level requirements for the application service request.

If the required service levels cannot be met by the MEC cluster (block 720—No), process 700 may include initiating a query for a local MEC cluster (block 730), and receiving transfer instructions (block 740). For example, MEC cluster 135 (e.g., resource measuring system 205) may determine that it cannot support latency requirements for the application client requesting services on UE device 180. MEC cluster 135 may query MEC orchestrator 140 to determine if a closer MEC cluster 135 or another MEC cluster 135 is available to provide service for UE device 180. MEC orchestrator 140 may identify a local MEC cluster and provide transfer instructions to MEC cluster 135.

Process 700 may also include soliciting user authorization to transfer MEC services to another MEC cluster (block 750), and determining if the MEC transfer is approved by the user (block 760). For example, MEC cluster 135 (e.g., resource measuring system 205) may provide a message for presentation on UE device 180 to solicit permission to move/copy MEC resources to a different MEC cluster. UE device 180 may provide, to MEC cluster 135, the user's input to approve or reject the transfer.

If the MEC transfer is approved by the user (block 760—Yes), process 700 may include transferring data to the new MEC cluster via a direct connection (block 770) and directing the UE device 180 to send an application service request to the new MEC cluster (block 780). For example, MEC cluster 135 (e.g., peer compute manager 210) may establish a temporary direct connection with the new MEC cluster to deploy resources on MEC cluster. When the resources are configured at the new MEC, MEC cluster 135 may provide, to UE device 180, information to cause UE device 180 to direct an application service request to the new MEC cluster.

If the required service levels can be met by the MEC cluster (block 720—Yes) or if the MEC transfer is not approved by the user (block 760—No), process 700 may include servicing the application at the current MEC cluster (block 790). For example, the "home" MEC cluster 135 may continue to provide service to the non-local UE device 180 as long as service requirements are being met. According to an implementation, MEC cluster 135 (e.g., resource measuring system 205) may continue to monitor resource usage of non-local UE devices to confirm continued adherence to service level requirements. MEC cluster 135 may also periodically check to determine whether service level requirements can be met more efficiently in another MEC cluster 135.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks or signal shave been described with regard to the processes illustrated in FIGS. 4, 5 and 7, the order of the blocks or signals may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

What is claimed is:

1. One or more network devices, comprising:
one or more processors configured to:
receive, from a user equipment (UE) device, an application service request for edge resources, wherein the one or more network devices are in a home edge location that stores customer data for an application;
determine, based on a dynamic resource update of the one or more network devices, that service level requirements for the application service request cannot be met by the one or more network devices;
provide, to an orchestration device, a location-based query for a different set of network devices to service the application service request;
receive, from the orchestration device and after providing the location-based query, transfer instructions to direct the application service request to the different set of network devices; and
transfer, to the different set of network devices, the customer data to support the application service request.

2. The one or more network devices of claim 1, wherein the service level requirements include a latency requirement.

3. The one or more network devices of claim 1, wherein, when transferring the customer data, the one or more processors are further configured to:
transfer the customer data via one of port forwarding, bridging, or a peer to peer server configuration.

4. The one or more network devices of claim 1, wherein the one or more processors are further configured to:
solicit, from the UE device and after receiving the transfer instructions, user authorization to transfer the customer data to the different set of network devices.

5. The one or more network devices of claim 1, wherein the one or more processors are further configured to:
receive, from the orchestration device, transfer instructions to direct the application service request to the different set of network devices, and
direct the UE device to send a new application service request to the different set of network devices.

6. The one or more network devices of claim 1, wherein, when determining that the service level requirements for the application service request cannot be met, the one or more processors are further configured to:
compare available resources and capabilities of the one or more network devices against parameters of an application policy.

7. The one or more network devices of claim 1, wherein, when determining that the service level requirements for the application service request cannot be met, the one or more processors are further configured to:
compare available resources and capabilities of the one or more network devices against minimum round-trip delay time (RTT) parameters of an application policy.

8. The one or more network devices of claim 1, wherein the one or more processors are further configured to:
maintain redundancy with the one or more network devices and the different set of network devices for a period based on usage patterns of the UE device.

9. The one or more network devices of claim 1, wherein, when determining that the service level requirements for the application service request cannot be met, the one or more processors are further configured to:
compare available resources and capabilities of the one or more network devices against guaranteed minimum throughput parameters of an application policy.

10. A method, comprising:
  receiving, by a network device in an edge network, an application service request from a user equipment (UE) device, wherein the network device is in a home edge location and stores customer data for an application;
  determining, by the network device and based on a dynamic resource update of the network device, that service level requirements for the application service request cannot be met by the network device;
  providing, by the network device and to an orchestration device, a location-based query for a different set of network devices to service the application service request;
  receiving, from the orchestration device and after providing the location-based query, transfer instructions to direct the application service request to the different set of network devices; and
  transferring, to the different set of network devices, the customer data to support the application service request.

11. The method of claim 10, wherein the service level requirements include a latency requirement.

12. The method of claim 10, wherein transferring the customer data further comprises:
  transferring the customer data via one of port forwarding, bridging, or a peer to peer server configuration.

13. The method of claim 10, further comprising:
  soliciting, from the UE device and after receiving the transfer instructions, user authorization to transfer the customer data to the different set of network devices.

14. The method of claim 10, wherein determining if service level requirements for the application service request can be met further comprises:
  receiving, from the orchestration device, transfer instructions to direct the application service request to the different set of network devices, and
  directing the UE device to send a new application service request to the different set of network devices.

15. The method of claim 10, wherein determining that the service level requirements for the application service request cannot be met further comprises:
  comparing available resources and capabilities of the network device against parameters of an application policy.

16. The method of claim 10, wherein determining that the service level requirements for the application service request cannot be met further comprises:
  comparing available resources and capabilities of the network device against minimum round-trip delay time (RTT) parameters of an application policy.

17. The method of claim 10, further comprising:
  maintaining redundancy with the network device and the different set of network devices for a period based on usage patterns of the UE device.

18. A non-transitory computer-readable storage medium containing instructions, executable by at least one processor, for:
  receiving, by a network device in an edge network, an application service request from a user equipment (UE) device, wherein the network device is in a home edge location and stores customer data for an application;
  determining, by the network device and based on a dynamic resource update of the network device, that service level requirements for the application service request cannot be met by the network device;
  providing, by the network device and to an orchestration device, a location-based query for a different set of network devices to service the application service request;
  receiving, from the orchestration device and after providing the location-based query, transfer instructions to direct the application service request to the different set of network devices; and
  transferring, to the different set of network devices, the customer data to support the application service request.

19. The non-transitory computer-readable storage medium of claim 18, wherein the service level requirements include a latency requirement.

20. The non-transitory computer-readable storage medium of claim 18, further comprising instructions for:
  soliciting, from the UE device, user authorization to transfer the customer data to the different set of network devices.

* * * * *